Jan. 23, 1968     A. T. GODSCHALX     3,365,382
ELECTRICAL DISTRIBUTION SYSTEM FOR CONTINUOUS PLATING APPARATUS
Filed Sept. 9, 1964     4 Sheets-Sheet 1

INVENTOR
ADRIAN T. GODSCHALX

BY
ATTORNEY

Fig. 2

United States Patent Office 3,365,382
Patented Jan. 23, 1968

3,365,382
ELECTRICAL DISTRIBUTION SYSTEM FOR
CONTINUOUS PLATING APPARATUS
Adrian T. Godschalx, 223 N. Green Bay St.,
Appleton, Wis. 54911
Filed Sept. 9, 1964, Ser. No. 395,162
7 Claims. (Cl. 204—211)

ABSTRACT OF THE DISCLOSURE

In an apparatus for continuously chrome plating a moving papermaking wire, the woven wire passes over collector rolls before entering and after leaving a chromium ion electrolyte. In the electrolyte, the wire passes between a pair of lead anodes. The collector rolls have sliding contacts riding on their surfaces that are connected through center-fed, equal resistance, series-parallel networks to negative terminals of a bank of rectifiers. The anodes are connected through end-fed, equal resistance, series-parallel networks to positive terminals of the rectifiers. The sliding contacts on the collector rolls are spaced according to a formula set forth in the specification and claims.

---

The present invention relates to an electrical distribution system for an electroplating apparatus, and more particularly the invention resides in means for distributing current equally across a sheet to be plated comprising means for electrically contacting said sheet, means for dispersing current uniformly across said sheet from a plurality of discrete circuit branches, and means for delivering equal current to each of said discrete circuit branches.

Notwithstanding the early development of fundamental scientific relationships between electrolytic deposition of metal and current flow, and in spite of the heavy accretion of empirical knowledge in the plating art, the problems encountered in producing a high quality, critically fine, uniform electrodeposited metal plate over the broad surface expanse of a metallic sheet had not been solved prior to the present invention. The successful chromium plating of a foraminous sheet, such as a papermaking wire, on a full scale commercial level required surmounting those problems, and some of the solutions achieved are the subject matter of this invention. The nature of those problems may best be defined in terms of the characteristics of a papermaking wire, and of the experimental mechanisms preceding the commercial apparatus of the present invention.

A papermaking wire is a foraminous sheet, which, for use on present-day papermaking machines, may be up to 350 inches wide and 400 feet long. Conventionally the papermaking wires are endless woven wire fabrics (perforated sheets have also been used) of fine mesh which are mounted to be driven about a series of cylindrical rolls on a papermaking machine. As used in a Fourdrinier machine, the pulp slurry is deposited on the papermaking wire where the water is drained away through the interstices or foramina of the wire, and the paper web is formed and conveyed on the wire to a press section for further drying speeds of about 2,000 feet per minute, and sometimes as high as 4,000 feet per minute. The quality of the paper produced depends in large part upon the precision uniformity and high quality of the surfaces of the papermaking wire, and the durability of the wire depends upon its resistance to fatigue, abrasion and corrosion.

The feasibility and superiority of chromium plated papermaking wires has been established with the products of an experimental, pilot plant continuous plating apparatus. The pilot apparatus, which could plate wires no larger than 138 inches by 84 feet, suspended a woven, endless wire about a number of supporting rolls, one of which was driven, so that the wire would pass through a plating tank containing a conventional chromium plating solution. Before entering and after leaving the plating tank, the wire passed over a copper collector roll, both of which were connected through sliding contacts at each end to the negative terminal of a rectifier. In the plating tank the wire passed between a pair of anodes connected to the positive terminal of the rectifier.

While the basic structure of this prior art pilot apparatus proved to be sound, even with that limited capacity apparatus, many difficulties were encountered. The quality of the plating was often unaccountably spotty, some areas being quite rough, so that when they were tested on papermaking machines they caused severe abrasion to the papermaking machine. The thickness of the plating varied erratically, wearing through too quickly in some spots and manifesting premature fatigue cracks in others. Sometimes holes were burned in the wire while in contact with the negatively charged collector rolls. The most consistently acceptable results were achieved when the wire moved at an uneconomically low speed of 5/8 inch per minute.

When the basic apparatus of the pilot plant was expanded to commercial dimension and capacity, the difficulties encountered with the smaller apparatus were magnified many times. The speed of the wire had to be increased to at least 2 inches per minute, and preferably 4 or more inches per minute, and this increased speed by decreasing the time of exposure of the wire to electrolytic action required the use of much greater magnitudes and quantities of current. At the same time burning of the wires had to be eliminated to prevent destruction of the expensive, delicate, woven wires. Also, a uniformly bright and smooth plating was required. The thickness of the plating had to be made uniform throughout, and it had already been decided that the thickness of the plating should be standardized at 0.000070 inch on the wear side of the wire and 0.00005 inch on the papermaking side to achieve the desired advantages without excessive loss of flexibility. Finally, a commercial apparatus had to accommodate wires at least 308 inches wide and several hundred feet long.

The current carrying capacity of apparatus meeting those requirements, it was calculated, had to be about 25,000 amperes, which had to be distributed over the entire area of the anode and the wire between the anodes at a constant potential of about seven volts. Although the wire must conduct the full current flow, it was found capable of doing so if adequately cooled. It was discovered that the burning of the wire experienced with the pilot apparatus was caused by an uneven contact between the wire and the collector rolls, with the result that only small areas of wire were forced to conduct the total current for the whole wire. This was brought about by inevitable variations in tension across the wire. It was also discovered that the problem was self-aggravating, since distortion, expansion and contraction resulting in puckers and pockets is brought about by local overheating. Further, the distortion was found to be proportional to the square of the current inequality across the wire. Rubber pressure rolls on top of the wire at the point of contact with the collector roll and increasing wire tension were tried, with only moderate and variable success. Then it was discovered that if the area of contact between the wire and the collector roll, or the wrap of the wire, were 135° or more, good contact will be achieved across the entire wire independent of tension.

With the problem of uniform wire contact resistance solved, the matter of uniform current distribution to the lines of contact between the collector rolls and the wire had to be met. If the current were fed to the collector rolls, as in the pilot apparatus, through sliding contacts at each end, the edges of the wire would present the shortest path to the electrolyte and draw sufficient current to burn the wire, whereas the center of the wire would be inadequately fed due to the IR losses in the roll. This was borne out by measurements of the products of the experimental machine showing increasingly lighter depositions of chromium toward the center of the wires. According to the present invention, a plurality of sliding contacts are spaced axially along the entire lengths of collector rolls moderating the current variances across the wire. Also, the present invention treats the collector roll as a substantially uniform medium through which current between the wire and the sliding contacts might be dispersed to achieve a perfectly uniform current distribution across the line of contact of the wire and the collector roll. This approach leads to the discovery of a relationship between the diameter of the roll and the spacing of the sliding contacts from which the proper spacing of the sliding contacts could be calculated so as to achieve practically uniform current dispersion over the entire width of the wire.

Also means for evenly distributing the heavy current flow at low voltages to the anodes and to the collector roll were required. If the distribution system of the pilot apparatus were used, the sliding contacts at the ends of the collector rolls would need to have a capacity of 12,000 amps with minimal contact losses to the collector rolls, and the rolls themselves would have to be solid copper and of sufficient diameter to conduct such currents without excessive IR losses. However, brushes or sliding contacts capable of meeting such specifications were neither available nor economically feasible, and a solid copper roll of adequate dimensions would not only be economically prohibitive but it would not support its own weight, much less the stress of the taut wire.

The present invention overcame those obstacles by connecting the collector rolls to the current source with sliding contacts at a plurality of axially spaced positions along the entire length of the rolls. By means of the device, the current fed to any one position need be no greater than the total current load divided by the number of positions. Hence, the current carrying capacity of the collector rolls need be no greater than the current fed to one of the positions, permitting the use of a conventional roll with only a relatively thin shell of copper about it for the cathode collector roll.

Additionally, it was required that the quantity of current flow at each position be precisely identical in order to achieve a satisfactorily uniform weight and quality of plating across the entire 308 inches width of the wire. The pilot apparatus again offered no guide, since its collector rolls were simply end fed. This problem was overcome by the novel series-parallel distribution system of the present invention which ensures that equal quantities of current will flow at each position on the collector rolls.

Accordingly, it is an object of the present invention to provide a current distribution system for a continuous electroplating apparatus whereby extremely large quantities of current may be conducted from a source and distributed evenly across a long sheet of material being continuously plated.

It is another object of the present invention to provide uniform distribution of large quantities of current at very low voltages throughout a continuous electroplating apparatus.

It is another object of the present invention to provide an electrical distribution system for a continuous plating apparatus whereby equal increments of current may be distributed to a plurality of sliding contacts axially aligned across the surface of a collector roll.

It is another object of the present invention to provide a uniformly good electrical contact between a collector roll and a flexible, moving conductive sheet across the entire surface expanse of the sheet.

It is another object of the present invention to provide uniform continuous dispersion of current from a plurality of sliding contacts on a collector roll across the entire width of a conductive sheet in electrical contact with the collector roll.

It is another object of the present invention to provide means for feeding large quantities of current to a collector roll so that only a minimum amount of copper or other conductive material is required in the roll, and that in only a peripheral shell on the roll.

It is another object of the present invention to provide an electrical distribution system for a continuous electroplating apparatus whereby large, expansive sheets may be continuously plated at economical speeds.

It is another object of the present invention to provide an electrical distribution system for an electroplating apparatus whereby metal may be continuously deposited across very extensive sheet surfaces at precise uniform thickness and of uniformly high quality.

It is another object of the present invention to provide an electrical distribution system for a continuous electroplating apparatus for chromium plating papermaking wires whereby large quantities of current may be introduced into the papermaking wire without overheating or burning any portion of said wire.

It is another object of the present invention to provide an electrical distribution system for an electroplating apparatus whereby large quantities of current at low voltage may be conducted with a minimum voltage drop and power dissipation.

The foregoing and other objects and advantages will appear from following the description of the embodiment of the invention shown in the accompanying drawings which form a part of this disclosure. This embodiment is described in sufficient detail to enable those skilled in the art to practice this invention, but structural changes may be made in the embodiment described and other embodiments may be used in practicing the present invention. Hence, the following detailed description is not to be considered definitive as to the scope of the invention, which instead is particularly pointed out and distinctly claimed in the claims found at the conclusion of this specification.

In the drawings:

FIG. 4 is a view in section of a collector roll and the papermaking wire in the apparatus of FIG. 1.

Figure 1:
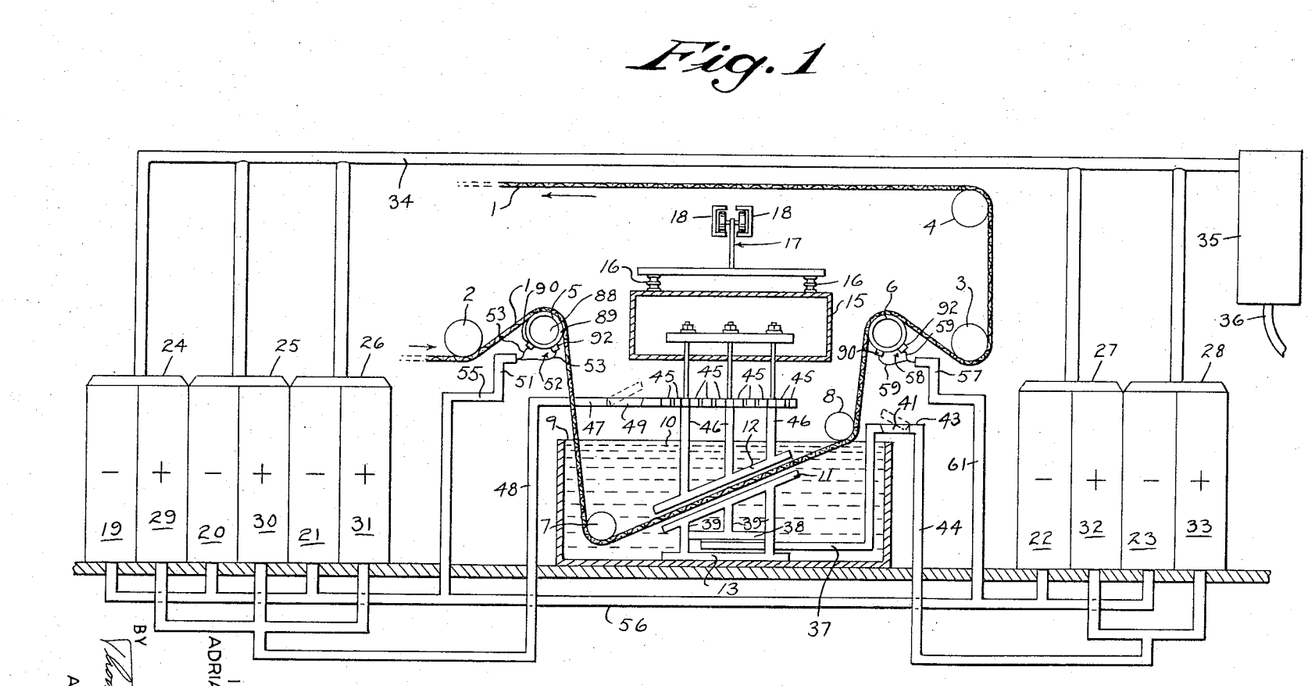
FIG. 1 is a side elevation partly in section of a continuous electroplating apparatus embodying the present invention.

Referring now to FIG. 1, a foraminous sheet 1 is shown and will hereafter be referred to as the wire 1, since it is an endless woven wire of precisely defined and highly uniform structural characteristics for use on a Fourdrinier papermaking machine. The wire 1 may be as wide as 308 inches and several hundred feet long, depending upon the papermaking machine for which it is made. The mesh count of the wire 1 is likely to be between 70 and 100 although it may be lower also, again depending upon customer specifications. Warp and weft strands of phosphor bronze or brass, although other materials are sometimes used, having specified diameters which may be between 0.003 inch and 0.016 inch, are woven together to form the wire 1, and the ends of the wire 1 are soldered to make it endless. When the strands are woven together they are bent, where they cross, forming knuckles, and these knuckles on the inside of the wire 1 will support the wire on the papermaking machine, while the knuckles on the outside of the wire will support the paper web which is formed thereon. The inside of the wire 1 is sometimes referred to as a suction box side and it sustains virtually all of the abrasive wear to which the wire 1 is subjected, while the outside of the wire 1 is referred to as the papermaking side and suffers little or no abrasive wear. Hence, the thickness of the chromium coating to be plated on the wire 1 has at the present time been standardized at 0.000049 inch on the papermaking side and 0.000070 inch on the suction box side, this being deemed sufficient to sustain abrasive and corrosive wear without excessively reducing wire 1 flexibility so as to bring about premature fatigue failures. The knuckles on the wire 1, which function as indicated during the papermaking process, also affect the plating of the wire in that they form point contacts by which an electrical charge may be introduced into the wire and they form preferential points for electrolytic currents in the bath. Also, it must be remembered that the surface area of the wire 1 is greater than the surface of a solid sheet, since it must be considered to be the sum of the areas of the strands. Hence, the deposition by weight on the wire 1 will be in the neighborhood of 0.113 ounce of chromium per square foot and this deposition applied by the apparatus to be described requires a current density of about 4.5 amperes per square inch, 1.5 amperes per square inch to the outside of the wire 1 and 3.0 amperes per square inch to the inside of the wire 1.

In the plating apparatus, the wire 1 is supported about support rolls 2, 3 and 4, plus an appropriate number of additional support rolls to the left of those shown in the drawings but which are not shown here in order to preserve maximum clarity in the drawings. These support rolls 2, 3 and 4 are conventional steel rolls similar to those used on papermaking machines, and they are mounted so as to be electrically isolated from the rest of the apparatus except through contact with the wire 1. One or more of the support rolls 2, 3 and 4 (or those not shown) may be driven by an appropriate motive force, preferably an electric motor. From the support rolls 2, 3 and 4, the wire 1 is driven over rotatably mounted cathode collector rolls 5 and 6, which are described in greater detail below. Between the cathode collector rolls 5 and 6, the wire 1 passes under guide rolls 7 and 8 which may be made of a plastic, such as polyvinyl chloride, which will hereafter be referred to by the popular notation, pvc. The cathode collector rolls 5 and 6 and the guide rolls 7 and 8 are mounted, like the support rolls 2, 3 and 4, so as to be electrically isolated from the rest of the apparatus, and in addition to the electrical functions and the guiding functions, they also perform as support rolls and may be so termed where that function is referred to.

The guide rolls 7 and 8 are mounted in a plating tank 9 which is made of steel lined with an inert, nonconductive plastic such as pvc. The plating tank 9 is made sufficiently large to contain the wire 1 and its necessary support apparatus and other components of the electrolytic cells, and is adapted to receive a constantly circulating electrolyte 10 of controlled temperature and concentration from a reservoir (not shown). The electrolyte 10 is a conventional chromic acid plating bath. The wire 1 passes through the plating tank 9 from left to right in the drawings, and hence the left hand side of the tank may be termed the entry end, while the right hand side may be termed the exit end, so the adjacent cathode collector rolls 5 and 6 may be termed appropriately entry collector roll 5 and exit collector roll 6. The plating tank 9 is also mounted so as to be electrically isolated from the rest of the apparatus.

Within the plating tank 9 are a pair of inert, parallel anodes 11 and 12, made of lead. Both lower and upper anodes 11 and 12 are sixteen inches long, from entry end to exit end, and as wide as the wire 1 to be plated, and both are mounted so as to slope upward from near the bottom of the entry end of the tank 9 towards the top of the exit end of the tank 9 and are completely immersed in the electrolyte 10. The lower anode 11 rests upon a plastic sheet 13 made of plexiglas which insures its electrical isolation from the plating tank 9. The upper anode 12 is suspended from a mounting structure 14 in an exhaust hood 15 directly over the plating tank 9. The exhaust hood 15 is hung on porcelain insulators 16 from a trolley 17 which moves in channel members 18. The upper anode 12 is adapted to be raised and lowered by a mechanism which is not shown here so that it may be raised above the tank 9 so as to ride with the hood 15 on the trolley 19 clear of the tank 9 when the wire 1 is being mounted in position for plating.

The external circuit including the bus bar distribution network is critical to the proper operation of a continuous plating apparatus. The circuit from the wire 1, serving as a cathode, to the anodes 11 and 12 may be termed the internal circuit, and its electrical characteristics, which are assumed for the purposes of this discussion, are governed by such properties as pH, ion concentration, temperature and the like. The entry collector roll 5 and the exit collector roll 6 are electrically identically fed from parallel connected negative output terminals 19, 20, 21, 22, 23 of rectifier 24, 25, 26, 27 and 28. The lower anode 11 is fed by parallel connected positive output terminals 29 and 30 of the two rectifiers 27 and 28 on the right in the drawing in FIG. 1. The upper anode 12 is fed by parallel connected positive output terminals 31, 32 and 33 of the three rectifiers 24, 25 and 26 shown on the left in FIG. 1. The input terminals of the rectifiers 24 through 28 are connected in parallel through an alternating current supply bus 34 to receive a 480 volt, three phase alternating current output from a transformer 35, which is in turn supplied with a 4,130 volt, three phase power from a power line 36. Each rectifier 24 through 38 produces an output of 5,000 amperes of unidirectional current which will hereafter be referred to by the shorthand designation, D.C. current. Design considerations dictated the use of five rectifiers, and the requirement for a 1:1.4 relationship of plating thicknesses on the papermaking side and the suction box side of the wire 1 required the use of separate power supplies for each anode 11 and 12.

Figure 2:
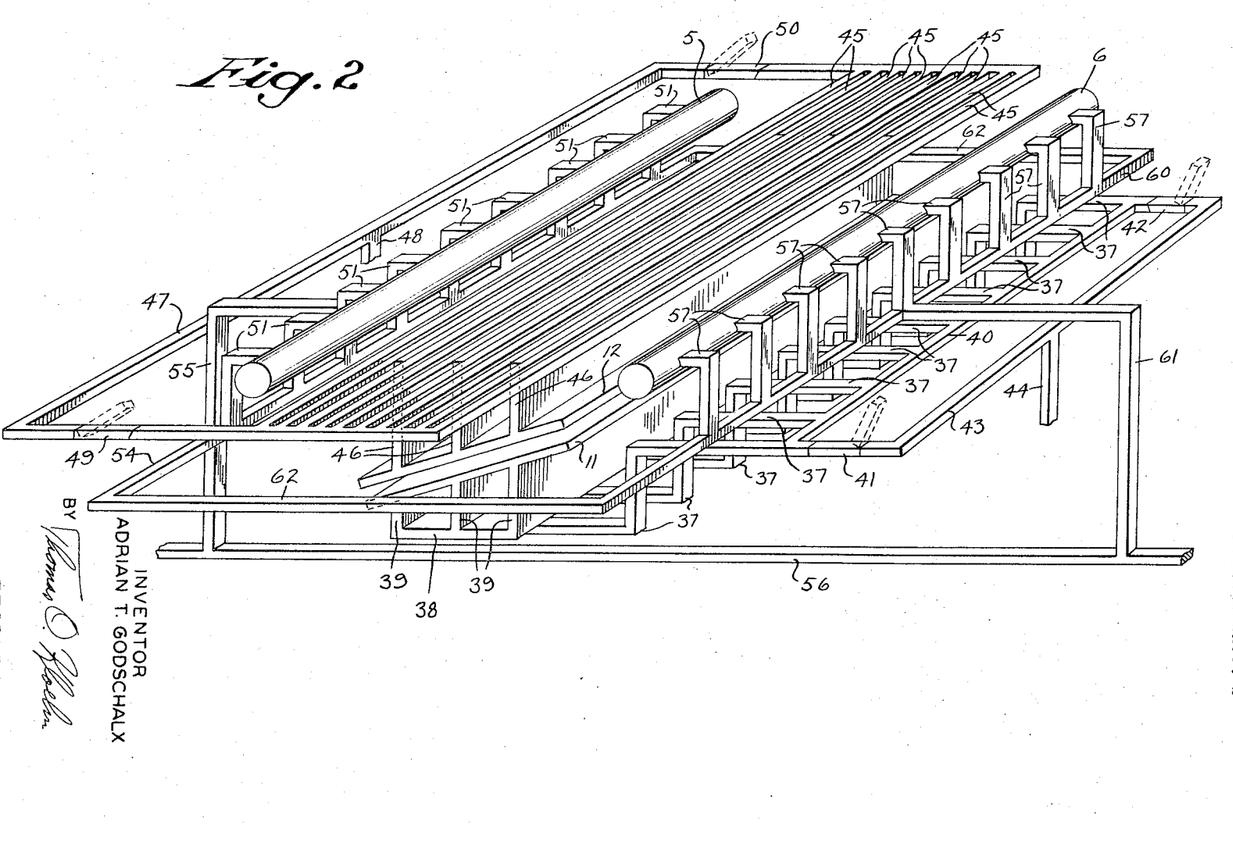
FIG. 2 is a perspective of the bus bar distribution network to the electrodes in the apparatus shown in FIG. 1.

The separate bus bar distribution nets to the anodes 11 and 12 are very similar. The lower anode 11 is supplied through nine equally spaced, lead feeder conductors 37, which are connected at one end to a lead cross member 38 to feed three lead conductor plates 39 on the bottom of a lower anode 11. The other ends of the feeder conductors 37 are connected to a copper feeder bus 40, and both ends of the feeder bus 40 are connected through bus section switches 41 and 42 across a copper distributor bus 43, which is center fed from the two parallel connected rectifiers 27 and 28 by a copper main bus 44. Similarly, the upper anode 12 is fed through ten parallel, copper feeder buses 45 that are connected to the top of three lead conductor plates 46 at nine equally spaced positions along the length of the conductor plates 46 on the top of the upper anode 12. The ends of the feeder buses 45 are connected to the end portions of a copper distributor bus 47 which is center fed from the three rectifiers 24, 25 and 26 by a main bus 48. Between the main bus 48 and both ends of the feeder buses 45 and the distributor bus 47 are bus section switches 49 and 50. The term "center" as used here to describe the feed to the various buses refers to the electrical center which is the point where the resistance to both ends are equal. As is evident, the upper and lower anodes 12 and 11 are independently fed so that about ⅔ of the plating current, of 15,000 amperes, comes from the upper anode 12 while only ⅓ or 10,000 amperes of plating current comes from the lower anode 11.

By contrast to the independently fed anodes 11 and 12, the collector rolls 5 and 6 are fed in common from what amounts to a single source, since the wire 1 serves as a single cathode and must conduct all of the electrolytic current. The entry cathode collector roll 5 is fed by nine equally spaced, copper risers 51 through sliding contacts 52 which ride on the surface of the collector roll 5 and are connected to the risers 51 through flexible shunts 53. The risers 51 are connected to a copper distributor bus 54 which is center fed by a copper linking bus 55. The linking bus 55 is connected to a copper main bus 59 to which the negative output terminals 19, 20, 21, 22 and 23 of all five rectifiers 24, 25, 26, 27 and 28 are connected in parallel. The exit cathode collector roll 6 is also fed by nine equally spaced, copper risers 57 through sliding contacts 58 which ride on the surface of the collector roll 6 and are connected to the risers 57 through flexible shunts 59. The risers 57 are also connected to a copper distributor bus 60 which is center fed by a linking bus 61 connected at its other end to the main bus 56. The ends of the entry distributor bus 54 and the exit distributor bus 60 are joined by connector buses 62 to complete a loop.

Figure 3:
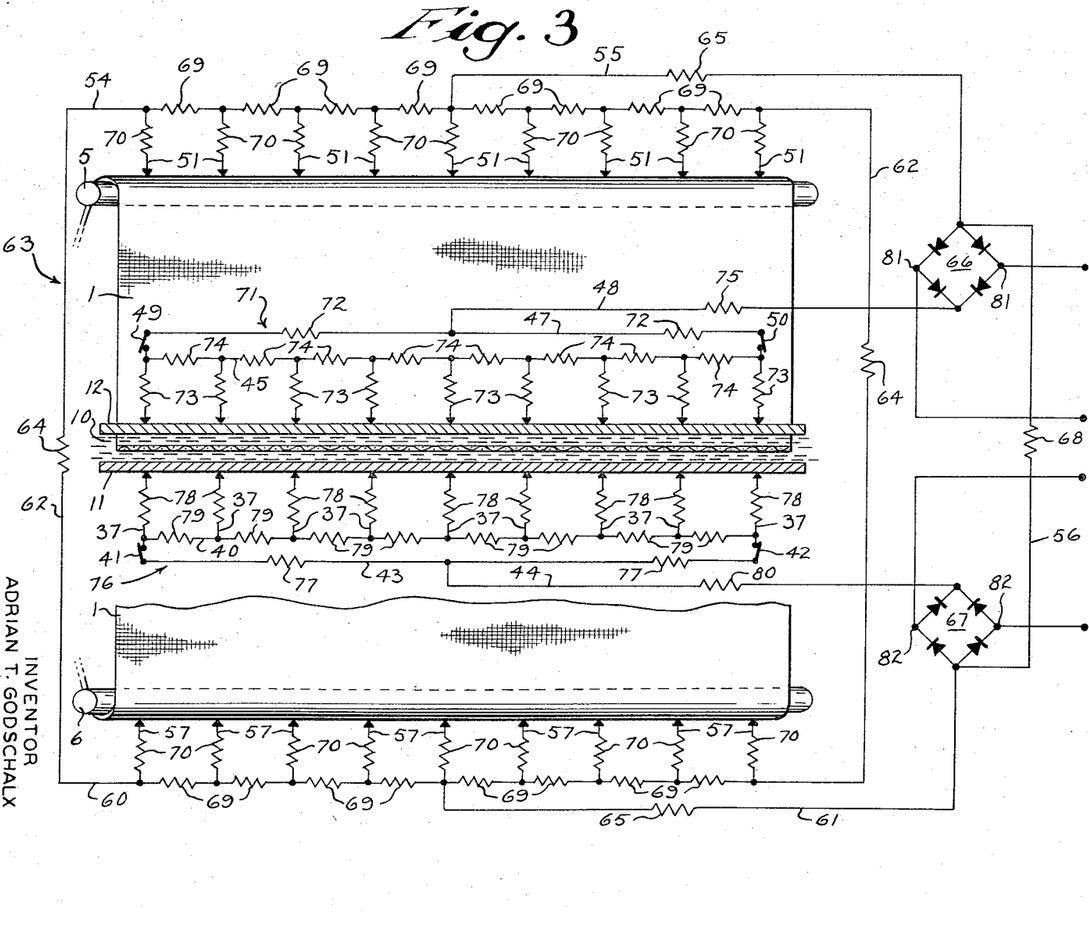
FIG. 3 is a diagrammatic representation of the complete distribution network shown in part in FIG. 2.

The electrical significance of the structure just described may best be seen by the diagrammatic illustration of FIG. 3, which illustrates the three major conductor loops making up the entire external electrical network. Central to the cathode collector roll net 63 is a single bus loop made up of the entry and exit distributor buses 54 and 60 and the connector buses 62, each of the latter having an equal resistance represented by the unit resistance 64 in the diagram. The bus loop is connected to the main bus 56 at diametrically opposite points, electrically speaking, by the linking buses 55 and 56 which are connected to the electrical centers of the two cathode distributor buses 54 and 60, respectively. The linking buses 55 and 56 each contain an equal resistance represented by unit resistances 65. The main bus 56, which contains the unit resistance 68, is connected to the negative terminals of two bridge rectifiers 66 and 67, an upper anode D.C. source 66 and a lower anode D.C. source 67. Each of the nine equally spaced risers 51 on the entry cathode distributor bus 55 feeding the entry collector roll 5, and the nine risers 57 on the exit cathode distributor bus 61 feeding the exit collector roll 66, contains a unit resistance 70 and each are separated by a unit resistance 69 in the respective distributor buses 54 and 60. The two unit resistances 65 and the linking buses are equal to one another and all of the unit resistances 69 and the distributor buses and the unit resistances 70 in the risers are equal.

The upper anode net 71 is also made up of a bus loop comprised of the upper anode feeder buses 45 and the upper anode distributor bus 47, the latter containing the section switches 49 and 50 and the equal unit resistances 72. Nine equally spaced resistances 73 connect the feeder bus 45 to the anode 12 and are separated by equal resistances 74 in the feeder bus 45. Opposite to the feeder bus 45 and between the two equal unit resistances 72 the upper anode distributor bus 47 is center fed by a main bus 48 containing a resistance 75, and the main bus 48 is connected to a positive terminal of the upper anode source 66, which corresponds to the three rectifiers 24, 25 and 26 shown to the left in the apparatus described in FIG. 1.

The lower anode net 76 is comprised of a bus loop made up of the lower anode feeder bus 40 and the lower anode distributor bus 43, which contains the section switches 41 and 42 and the equal unit resistances 77. The feeder conductors 37, which contain the equal resistances 78 and which are separated on the lower anode feeder bus 40 by the equal resistances 79, connect the lower anode feeder bus 40 to the lower anode 11. The main bus 44, containing the unit resistance 75, connects the electrical center of the lower anode loop opposite the lower anode feeder bus 40 and between the equal unit resistances 77 to the lower anode source 67 corresponding to the rectifiers 27 and 28 on the right hand structure shown in FIG. 1. The two direct current sources 66 and 67 represented by the bridge rectifiers shown in FIG. 3 have their input terminals 81 and 82 respectively connected across alternating current sources (not shown).

To simplify the discussion, each of the resistances 69 and the distributor buses 54 and 60, each of the unit resistances 70 in the risers 51 and 57, each of the unit resistances 74 in the feeder bus 45, each of the resistances 79 in the feeder bus 40, each of the resistances 73 in the contacts to the upper anode 12 and each of the resistances 78 in the feeder conductors 37 will be treated as equal. Similarly, the resistances 72 and 77 and the anode distributor buses 47 and 43 will be treated as equal, as will the resistances 75 and 80 in the anode main buses 48 and 44. The resistance of the collector rolls 5 and 6 are deemed to be substantially uniform throughout the length of the rolls, the resistance in the wire 1 is deemed to be substantially uniform across its entire area as are the resistances in the anodes 11 and 12 and the electrolyte 10, although these resistances are not represented in the diagram as unit resistances. The sliding contact resistance may be considered a part of the equal unit resistances 70 shown in the risers 51 and 57. However, some variations are possible. For example, if the resistances 70 in the risers 51 and 57 are all equal and the resistances 69 in the distributor buses 54 and 60 in the cathode are all equal to each other and to the unit resistances 74 and 79 in the anode feeder buses 45 and 40, respectively, it is not essential that the cathode distributor and feeder resistances 69, 74 and 79 equal the riser and feeder resistances 70, 73 and 78.

Having distributed the current equally to the anodes 11 and 12 and the cathode collector rolls 5 and 6, it is essential that a uniformly good contact be made between the wire 1 and the cathode collector rolls 5 and 6 across the entire width of the wire 1. To achieve this, the supporting roll 2 and the guide roll 7, serving a supporting roll capacity, are arranged relative to the entry collector roll 5 so that the wire 1 wraps around at least 135° of the cylindrical surface of the collector roll 5. Similarly, the supporting roll 3 and the supporting guide roll 8 are arranged relative to the exit collector roll 6 so that the wire 1 wraps around at least 135° of the cylindrical surface of the collector roll 6. FIG. 4 illustrates this contact between the wire 1 and the collector rolls 5 and with reference to the collector roll 6 specifically. This is done by arranging the supporting rolls 2, 7 and 3, 8 relative to their respective cathode collector rolls 5 and 6 so that tangents drawn from the surface of the supporting rolls 2, 7, 3 and 8 to the collector rolls 5 and 6, respectively, are tangent to the collector rolls 5 and 6, respectively, at points or lines 85 and 86 separated by at least 135° of the surface area of the collector rolls 5 and 6.

In FIG. 4, the collector roll 6 is shown in section, and radii 83 and 84 are drawn normal to the tangency of the wire 1 at the lines of initial contact 85 and 86 between the wire 1 and the collector roll 6. The angle 87 between the radii 83 and 84 is 135°. If the wrap of the wire 1 around the collector rolls 5 and 6 is substantially less than 135°, the contact between the wire 1 and the collector rolls 5 and 6 has been found to be uneven and greatly affected by the tension in the wire. However, it has been found that if the wrap is made at least approximately 135°, uniformly good contact is achieved across the entire width of the wire 1, and that this contact is independent of varying tension in the wire 1. It is to be understood, however, that the minimum figure of 135° is approximate relative to the size of the wire 1 and the collector rolls 5 and 6, so that a wrap of slightly less than 135° is not to be considered as failing altogether to achieve the uniformity of contact, provided that the variation under 135° is sufficiently small so that it may be said that the wrap is substantially 135°. A wrap, or area of rolls 5 and 6 and wire 1 contact greater than 135° will achieve the same result as the wrap of 135°.

FIG. 4 also illustrates the cross sectional structure of both collector rolls 5 and 6. The core structure 88 of the collector rolls 5 and 6 is conventional, but it is significant here that the conductive portion of the collector rolls 5 and 6 is confined to a comparatively thin cylindrical copper shell 89 around the surface of the conventional core structure 88. Prior to the present invention, a solid copper collector roll would have been required to conduct the necessary currents for the plating process. It is only with the present invention that all of the current may be conducted in a relatively thin, and correspondingly inexpensive, copper shell 89. In the embodiment shown, the overall diameter of the collector rolls 5 and 6 is approximately 8.4 inches and the copper shell is less than one inch thick.

Figure 5:
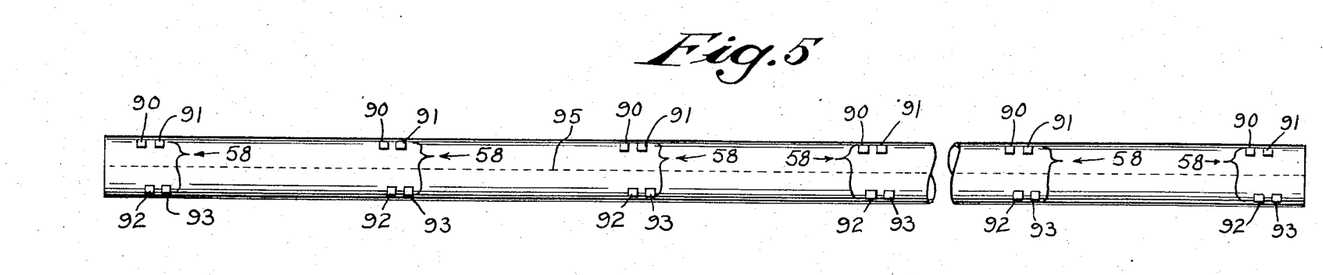
FIG. 5 is a bottom plan view of a collector roll.

Each of the sliding contacts 52 and 58 in the embodiment shown, as appears in FIG. 5, is made up of four individual brushes 90, 91, 92 and 93 which are connected in common to each of the risers 51 or 57. One pair of axially aligned brushes 90 and 91 is circumferentially spaced from the other pair of axially aligned brushes 92 and 93 equidistant from a line diametrically opposed to the center of the area of contact between the collector rolls 5 and 6 in the wire 1. The pairs of brushes 90, 91 and 92, 93 are axially offset one from another so that no two brushes bear against the same area on the surface of the collector roll 6, so that the wear may be distributed over the collector roll 6. In the present embodiment, four brushes 90, 91, 92 and 93 were decided upon to make up a sliding contact 52 or 58 on the basis of the conductivity, contact potential drop, coefficient of friction and proven characteristics of the commercially available brushes. Each of the brushes 90, 91, 92 and 93 is resiliently mounted in a conventional manner (not shown) to bear against the collector rolls 5 and 6 with a force of from four to five pounds, and each has a current carrying capacity of about 300 amps. The contact pressure of the resiliently mounted brushes 90, 91, 92 and 93 serves not only to achieve the desired electrical contact, but because of its location diametrically opposite to the area of contact between the wire 1 and the collector rolls 5 or 6, they also serve a mechanical function of adding support to the end mounted rolls so as to counteract the tendency of the rolls to sag towards the center. Although the particular brush arrangement disclosed here was found to be optimum in view of the specific embodiment shown and the commercial availability of components, undoubtedly many other arrangements of brushes or similar components would adequately serve as sliding contacts 52 and 58 in a specific embodiment.

Essential to the optimum, uniform plating of the wire 1 is a uniform distribution of current flow across the entire width of the wire. Prior to the present invention this was thought to be impossible. However, according to the present invention, if there is uniformly good contact across the entire width of the wire 1 and the collector rolls 5 and 6, the uniformity of the current dispersion over the entire width of the wire may be determined by the spacing between the sliding contacts 52 and 58, and the diameter of the collector rolls 5 and 6. The present invention achieves this by treating the collector rolls 5 and 6 as substantially uniform media through which current or electrical charges may be dispersed from discrete points, or circuit branches, such as the sliding contacts 52 and 58 respectively, uniformly across a broad area such as the area of contact between the wire 1 and the collector rolls 5 or 6.

Figure 6:
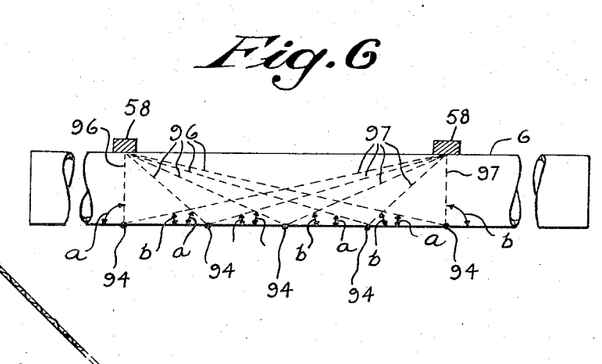
FIG. 6 is a side diagrammatic view of a segment of a collector roll to illustrate current paths in the roll.
Figure 7:
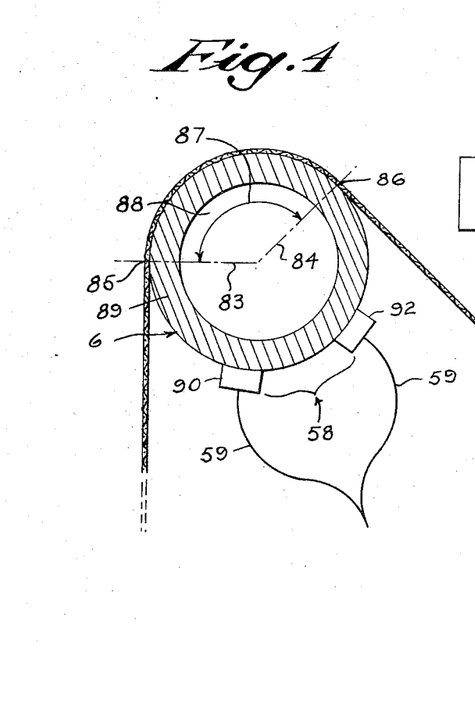

This concept is illustrated in FIG. 6 where the sliding contacts 58 are presented as single, solid blocks in section along a center line, on a segment of the exit collector roll 6. Random point-contacts 94 are represented between the wire 1 (not shown in FIG. 6) and the roll 6 along a base line 95 in the center of the area of wire contact, and these point-contacts 94 may be any of the thousands of wire knuckles contacting the roll 6 along that base line 95. From each of the point-contacts 94 there are two parallel current paths 96 and 97, one to each of the next adjacent negatively charged sliding contacts 58 on each side of the point-contact 94, seen by a positive charge on the wire 1 at the point-contact 94. The current path 96 makes an angle of incidence $a$ with the base line 95 and the current path 97 makes an angle of incidence $b$ with the base line 95. It has been found that if the spacing between the adjacent sliding contacts 58 is coordinated with the diameter of the collector roll 6 so that the sum of the sine of the angle $a$ plus the sine of the angle $b$ approaches one, the dispersion of current from the sliding contacts 58 to the wire 1 approaches perfect uniformity across the width of the wire 1. Whether the current flow is considered as electron flow from the sliding contacts 58 to the wire 1 or conventional positive charge flow from the wire 1 to the sliding contacts 58 makes no difference here.

Since the sines of the angles of incidence $a$ and $b$ may be determined by either the space between the sliding contacts 58 or the diameter of the roll 6, either of the two may be varied accordingly to produce the desired uniformity of current dispersion across the wire 1, when the other is fixed by external circumstances. Accordingly, in the embodiment shown, where the diameter of the roll 6 is approximately 8.4 inches, the sliding contacts 58 are spaced on centers 37 inches apart. As in most cases, there were design considerations limiting both contact spacing and roll diameter in the present embodiment, but nevertheless within the given limits satisfactory balance is achieved. Although the sums of the sines of the angles of incidence $a$ and $b$ do not equal one in this embodiment, they approach sufficiently closely to one in this apparatus to achieve adequate uniformity of current dispersion over the width of the wire 1 across the area of contact on the collector rolls 5 and 6 to provide uniform plating of the wire 1 between the anodes 11 and 12.

Although FIGS. 4, 5 and 6 have been arbitrarily drawn to show the exit collector roll 6, the structure and characteristics described apply equally well to the entry collector roll 5. Both rolls 5 and 6 have 135° or greater areas of contact with the wire 1. Both rolls 5 and 6 have nine equally spaced, axially aligned sliding contacts 52 and 58, respectively, each being made up of four branches 90, 91, 92 and 93. The centers of the sliding contacts 52 and 58 are located diametrically opposite to the base line 95, which base line 95 is in the center of the area of contact between the wire 1 and the rolls 5 and 6, respectively. The spacing of the sliding contacts 52 and 58 is the same for both rolls 5 and 6 since their diameters are equal, but that would not be the case if their diameters varied.

The operation of the apparatus should be evident from the foregoing discussion. As the wire 1, moving from left to right in the drawing, passes over the entry cathode collector roll 5, it is connected to the 25,000 ampere, 7 volt, negative D.C. output of the rectifiers 24 through 28, constituting the upper anode supply 66 and the lower anode supply 67. Similarly, after the wire 1 emerges from the plating tank 9, it passes over the exit cathode collector roll 6 where it is again connected to the 25,000 ampere output of the rectifiers 24 through 28. Between the two collector rolls 5 and 6, the wire 1 passes between the upper and lower anodes 12 and 11, respectively, while immersed in the electrolyte 10, so that the inner or suction box side of the wire 1 is connected through the upper anode 12 to the upper anode supply 66, consisting of the positive output terminals 29, 30 and 31 of the three rectifiers 24, 25 and 26 on the left, and its outer or papermaking side is connected through the lower anode 11 to the positive terminals 32 and 33 of the two rectifiers 27 and 28 on the right, constituting the lower anode supply 67. Due to the differential in the outputs of the upper and lower anode supplies 66 and 67, the inside or suction box side of the wire 1 receives 1.4 times as much chromium as the papermaking side. However, since the cathode collector rolls 5 and 6 are equally fed from the negative output terminals 19 through 23 of both supplies 66 and 67, half of the total 25,000 amperes is conducted by the wire 1 to each of the collector rolls 5 and 6. If the wire 1 is to be loaded to its full current carrying capacity, it is essential that each collector roll 5 and 6 conduct half of the total current. Hence, the invention achieves a differential plating while preserving a uniform current flow through the wire 1 and the cathode distribution net 63.

That the current flow is evenly distributed throughout the entire system may be verified by referring to the diagram in FIG. 3. Tracing the current flow from the positive output terminal of either source 66 or 67 through the corresponding anode 12 or 11 to either collector roll 5 or 6 and back to the source 66 or 67 through any of the one hundred sixty-two parallel paths shown, a count of the unit resistances encountered will show them to be equal. For example, a positive charge traveling from the upper anode source 66 through the entry collector roll 5 through any of the eighty-one paths, or a positive charge from the lower anode source 66 to the exit collector roll 6 through any of the eighty-one paths, each encounters nine unit resistances regardless of the path chosen. By means of the cathode main bus 56 and the connector buses 62, the current flow is evenly divided through the cathode net 63, even though the two anode sources 66 and 67 produce greatly different quantities of current.

The transmission of the current from the wire 1 to the collector rolls 5, 6 and to the sliding contacts 52 and 58, respectively, has already been described in considerable detail. The 135° of contact between the wire 1 and each of the collector rolls 5 and 6 ensures a uniformly good electrical connection between the wire 1 and the rolls 5 and 6. The coordination of diameters of the rolls 5 and 6 with the spacing of the corresponding sliding contacts 52 and 58 according to the formula described above produces a uniform dispersion of current flow between the discrete circuit branches of the cathode net 63 represented by the sliding contacts 52 and 58, and the broad surface of the wire 1 through the collector rolls 5 and 6. This provides uniform plating thicknesses across the wire and it prevents local overheating and burning of the wire.

Since each collector roll 5 and 6 must conduct approximately 12,000 amperes, the end feeding system of the prior art would require solid copper collector rolls 5 and 6 and even these would be inadequate for lack of structural strength as well as IR losses resulting between the edge of the wire 1 and the center of the wire 1 causing too much current flow at the edges and too little in the middle. The present invention avoids all these difficulties by feeding the collector rolls 5 and 6 at nine equally spaced positions along its axis. Hence, each section of the collector rolls 5 and 6 between the sliding contacts 52 and 58 and thus the collector rolls 5 and 6 as a whole need conduct only 1,333 amperes of current. Thus, only a copper shell 89 is required to conduct the current on each collector roll 5 and 6 and since equal currents are fed at each of the sliding contacts 52 and 58 the voltage drop problem is overcome.

Obviously, the utility of the present invention is not limited to the continuous plating of Fourdrinier papermaking wires 1, and its embodiment where differential plating is not required or only a single anode and collector roll is required would be greatly simplified. For example, a uniform plating on both sides would permit the use of a common D.C. source for feeding both anodes 11 and 12. Moreover, in the embodiment shown the application of 1.5 amperes per square inch to the outside of the wire 1 and the application of 4.5 amperes per square inch to the inside of the wire 1, results in operation at the minimum and maximum current densities consistent with a plating of satisfactory brightness for a papermaking wire, and substantially exceeds the limit set by the prior art for decorative plating. In fact, the invention solves problems encountered in electrolytically treating broad sheet surfaces of any sort, woven or perforated, foraminous or solid, moving or fixed, and so on. Such different applications or embodiments of this invention will be obviously apparent to one skilled in the art from the foregoing description, but the full scope of the invention is set forth in the following claims.

I claim:
1. In an electrical distribution system for a continuous electroplating apparatus, the combination comprising:
   a D.C. source having a positive output terminal and a negative output terminal;
   a plating tank containing an electrolyte;
   a support and drive means for continuously moving a sheet to be electroplated through said electrolyte;
   a cathode collector roll rotatably mounted to engage said sheet and impart an electrical charge substantially uniformly across its surface;
   an anode immersed in said electrolyte;
   and an electrical distribution network connecting a plurality of sliding contacts engaging said collector roll through equal resistance paths to one of said terminals of said D.C. source so as to uniformly distribute an electrical charge from said source across the surface of said collector roll and connecting a plurality of points on said anode through equal resistance paths to the other of said terminals of said D.C. source so that a current between said terminals through said electrolyte may pass through a plurality of equal resistance paths across the entire width of said sheet.

2. In an electrical distribution system for a continuous electroplating apparatus, the combination comprising:
   a D.C. source having a negative output terminal and a positive output;
   a plating tank containing an electrolyte;
   a support and drive means for supporting and continuously moving a sheet to be electroplated through said electrolyte;
   a cathode collector roll having a cylindrical surface, being rotatably mounted adjacent said plating tank relative to said support and drive means so that said sheet contacts said collector roll over at least approximately 135° of its cylindrical surface;
   an anode immersed in said electrolyte adjacent said sheet;
   and a series-parallel distribution network connecting said cathode collector roll to said negative terminal of said D.C. source through a plurality of axially arranged sliding contacts, and connecting said anode at a plurality of positions to said positive terminal of said D.C. source such that a charge from said positive terminal to said negative terminal encounters the same resistance through any one of said positions and said electrolyte and said sheet and any one of said sliding contacts.

3. In an electrical distribution system for a continuous electroplating apparatus, the combination comprising:
   a pair of D.C. sources having negative output terminals and positive output terminals;
   a plating tank containing an electrolyte and having an entry end and an exit end for a sheet to be electroplated;
   a cathode collector roll rotatably mounted near said entry end of said tank and a cathode collector roll rotatably mounted near said exit end of said tank, said cathode collector rolls having cylindrical surfaces and being positioned relative to support means for said sheet such that said sheet contacts no less than approximately 135° of said cylindrical surfaces;
   a plurality of sliding contacts mounted along said cylindrical surfaces of said cathode collector rolls and axially spaced equal distances apart such that a sum of sines of two angles formed between two current paths from centers of adjacent sliding contacts to a point on a base line on said collector rolls diametrically opposite said centers of said sliding contacts and between said sliding contacts approaches unity;

a cathode collector distribution net for charging said cathode collector rolls having a closed bus loop with a pair of distributor buses diametrically opposite each other in said loop and connected at their centers to said negative output terminals of both of said direct current sources, and a plurality of risers of equal resistance connecting said sliding contacts to said distributor buses at positions separated by equal resistances;

a pair of parallel anodes mounted in said plating tank and aligned between said entry end and said exit end;

and an anode distribution net for charging each of said anodes, each net having a closed bus loop having an an anode distributor bus connected across ends of a feed bus, said feed bus being connected at a plurality of positions separated by equal resistances to said anode through equal resistances, said anode distributor bus being connected at its electrical center to one of said positive terminals of one of said D.C. sources, said distribution nets being independently energized by one of said D.C. sources.

4. An electrical distribution network for a continuous electroplating apparatus comprising the combination of:

a unidirectional low voltage current source having a positive output terminal and a negative output terminal;

a conductive foraminous belt to be electroplated;

an electrolytic bath containing metal ions to be electrolytically deposited on said foraminous belt;

said foraminous belt being movably mounted to pass through said electrolytic bath;

an anode immersed in said bath;

a rotatably mounted collector roll in electrical contact with said foraminous belt;

an electrically endless loop conductor connected across said anode at a plurality of points separated by substantially identical resistances, and being connected at a point remote from said anode and electrically midway between the ends of said anode to said positive output terminal of said current source;

and a conductor bar connected at a plurality of points separated by substantially equal resistances to a plurality of axially aligned sliding contacts engaging said collector roll through said points being separated by substantially equal resistances, said sliding contacts being separated from said points by substantially equal resistances, and said conductor bar being connected to said negative output terminal of said current source at a point electrically centrally of said plurality of points.

5. In an electrical distribution system for an electrolytic cell for electroplating flat sheet material, the combination comprising:

a D.C. source having positive and negative output terminals;

a pair of sets of opposite electrodes conductively connected to each other through an electrolyte;

a first distribution network for connecting each electrode in one of said sets of electrodes to one of said terminals of said D.C. source, said network containing a plurality of equal resistance conductors electrically connected at one end to said electrode and at an opposite end to a plurality of feeder conductors separated by equal resistances on a feeder bus, and a distributor bus connecting each end of said feeder bus through equal resistances to said one terminal of said D.C. source;

and a second distribution network for connecting each electrode in the other set of electrodes to the other terminal of said source, said second network containing a second distributor bus connected at a plurality of points separated by equal resistances through equal resistances to said electrode in said other set and connected to said other terminal of said D.C. source at its electrical center.

6. In an apparatus for dispersing an electrical charge uniformly across the width of a conductive sheet, the combination comprising:

a conductive collector roll mounted for electrical contact with a surface of a conductive sheet;

a plurality of equally charged contacts in electrical connection with said collector roll and aligned in equally spaced relationship axially of said roll diametrically opposite said electrical contact between said collector roll and said conductive sheet;

said collector roll having a diameter of such dimension and said space between said contacts being of such dimension that current paths between any point-contact of said sheet and said roll on a base line diametrically opposite a line of centers of said charged contacts and the centers of two next adjacent charged contacts form angles of incidence with said base line such that the sum of the sines of said angles of incidence is approximately one.

7. In a system for providing uniform electrolytic current flow across a surface of a foraminous sheet to be continuously electroplated, the combination comprising:

an electrolytic bath containing metal ions of a metal to be electrolytically deposited and having an entry end and an exit end;

a pair of cylindrical collector rolls of a conductive material rotatably mounted one toward the entry and the other toward the exit of said electrolytic bath;

a pair of anodes of chemically inert electrically conductive material immersed in said bath in spaced relationship to provide an unobstructed path between them through said bath from said entry end to said exit end;

a foraminous sheet to be electroplated, movably mounted to pass through said electrolytic bath from said entry end to said exit end between said anodes and to have electrical contact with each of said collector rolls;

a plurality of sliding contacts engaging the cylindrical surfaces of said rolls and being adapted to receive equal electrically negative charges, said contacts on each roll being axially spaced so that a sum of sines of angles of incidence of current paths from two next adjacent sliding contacts to any point between them on a line of contact of said belt and said collector roll diametrically opposite said sliding contacts approaches one;

and a plurality of electrical conductors adapted to receive equal electrically positive charges connected to each of said anodes, said conductors being spaced apart on each of said anodes by equal electrical resistances.

References Cited
UNITED STATES PATENTS

| | | | |
|---|---|---|---|
| 891,361 | 6/1908 | Murphy | 204—223 X |
| 1,242,695 | 10/1917 | Hood | 204—28 X |
| 1,516,122 | 11/1924 | Scarles | 204—206 |
| 1,853,437 | 4/1932 | Kuttner | 204—206 X |
| 2,271,735 | 2/1942 | Hall | 204—206 |
| 2,382,018 | 8/1945 | Martin | 204—206 |
| 2,446,548 | 8/1948 | Nachtman | 204—211 |
| 2,753,298 | 7/1956 | Gray | 204—28 |
| 2,882,214 | 4/1959 | Summers et al. | 204—279 |
| 2,933,438 | 4/1960 | Lancy | 204—28 |

HOWARD S. WILLIAMS, *Primary Examiner.*

W. VAN SISE, *Assistant Examiner.*